(12) United States Patent
Pathria et al.

(10) Patent No.: US 6,728,695 B1
(45) Date of Patent: Apr. 27, 2004

(54) METHOD AND APPARATUS FOR MAKING PREDICTIONS ABOUT ENTITIES REPRESENTED IN DOCUMENTS

(75) Inventors: Anu K. Pathria, La Jolla, CA (US); Krishna M. Gopinathan, San Diego, CA (US); Theodore J. Crooks, La Mesa, CA (US); Edmond D. Chow, Encinitas, CA (US); Mark A. Laffoon, San Diego, CA (US); Dayne B. Freitag, Pittsburgh, PA (US)

(73) Assignee: Burning Glass Technologies, LLC, San Diego, CA (US)

( * ) Notice: Subject to any disclaimer, the term of this patent is extended or adjusted under 35 U.S.C. 154(b) by 0 days.

(21) Appl. No.: 09/589,180

(22) Filed: May 26, 2000

(51) Int. Cl.[7] .............................. G06F 17/30; G06F 7/00
(52) U.S. Cl. ........................ 707/2; 706/21; 707/104.1
(58) Field of Search ..................... 706/21; 707/1–5, 707/10

(56) References Cited

U.S. PATENT DOCUMENTS

| | | | | |
|---|---|---|---|---|
| 4,839,853 A | * | 6/1989 | Deerwester et al. ........... | 707/5 |
| 5,164,897 A | * | 11/1992 | Clark et al. .................... | 705/1 |
| 5,164,899 A | * | 11/1992 | Sobotka et al. ................ | 704/9 |
| 5,442,778 A | * | 8/1995 | Pedersen et al. ............... | 707/5 |
| 5,461,699 A | * | 10/1995 | Arbabi et al. ................. | 706/21 |
| 5,551,880 A | | 9/1996 | Bonnstetter et al. ........ | 434/236 |
| 5,675,819 A | * | 10/1997 | Schuetze ..................... | 704/10 |
| 5,758,324 A | * | 5/1998 | Hartman et al. ............... | 705/1 |
| 5,787,420 A | * | 7/1998 | Tukey et al. ................... | 707/5 |
| 5,873,056 A | * | 2/1999 | Liddy et al. ................... | 704/9 |
| 6,101,492 A | * | 8/2000 | Jacquemin et al. ............ | 707/3 |
| 6,115,718 A | | 9/2000 | Huberman et al. ......... | 707/102 |
| 6,144,964 A | | 11/2000 | Breese et al. ................. | 707/10 |
| 6,189,002 B1 | * | 2/2001 | Roitblat ......................... | 707/1 |
| 6,266,659 B1 | * | 7/2001 | Nadkarni ....................... | 707/3 |
| 6,304,864 B1 | * | 10/2001 | Liddy et al. .................. | 706/15 |
| 6,381,592 B1 | * | 4/2002 | Reuning ........................ | 707/3 |
| 2002/0045154 A1 | * | 4/2002 | Wood et al. ................ | 434/350 |
| 2002/0046199 A1 | * | 4/2002 | Scarborough et al. ........ | 706/21 |
| 2002/0065380 A1 | * | 5/2002 | de Hilster et al. .......... | 707/102 |
| 2002/0107853 A1 | * | 8/2002 | Hofmann et al. .............. | 707/7 |
| 2002/0111843 A1 | * | 8/2002 | Wellenstein .................... | 705/8 |
| 2002/0116203 A1 | * | 8/2002 | Cherry et al. .................. | 705/1 |

FOREIGN PATENT DOCUMENTS

WO      WO-02/07017 A2   *   1/2002  ........... G06F/17/60

OTHER PUBLICATIONS

Voorhees, E.M. "Query Expansion using Lexical–Semantic Relations", Proceedings of the 17th Annual ACM Conference on Research and Development in Information Retrieval, pp. 61–69, Aug. 1994.*

(List continued on next page.)

Primary Examiner—John Breene
Assistant Examiner—Luke S Wassum
(74) Attorney, Agent, or Firm—McDermott, Will & Emery; Paul Devinsky

(57) ABSTRACT

A method and apparatus is disclosed for making predictions about entities represented in documents and for information analysis of text documents or the like, from a large number of such documents. Predictive models are executed responsive to variables derived from canonical documents to determine documents containing desired attributes or characteristics. The canonical documents are derived from standardized documents, which, in turn, are derived from original documents.

5 Claims, 7 Drawing Sheets

OTHER PUBLICATIONS

Freund, Y. and R.E. Schapire, "Experiments with a New Boosting Algorithm", Proceedings of the 13$^{th}$ International Conference on Machine Learning, 1996.*

Seymore, K., A. McCallum and R. Rosenfeld, "Learning Hidden Markov Model Structure for Information Retrieval", Proceeding of the AAAI–99 Workshop on Machine Learning for Information Extraction, Jul. 1999.*

Hofmann, T. "Probabilistic Latent Semantic Indexing", Proceedings of the 22$^{nd}$ Annual ACM Conference on Research and Development in Information Retrieval (SIGIR 99), pp. 50–57, Aug. 1999.*

"HR Software Trends: The Revolution is Here", Workforce, vol. 79, No. 10, Oct. 2000.*

BusinessWire, "Burning Glass Technologies Announces Equity Investment from HNC Software", Aug. 31, 2000.*

Freitag, D. and Kushmerick, N. "Boosted Wrapper Induction", Proceedings of the AAAI–2000 Conference, Jul. 2000, pp. 577–583.*

Craven, M. et al. "Learning to Construct Knowledge Bases from the World Wide Web", Artificial Intelligence, vol. 118, No. 1/2, Jan. 19, 2000, pp. 69–113.*

Hofmann, T. "Probabilistic Latent Semantic Indexing", Proceedings of the 22$^{nd}$ ACM Conference on Research and Development in Onformation Retrieval (SIGIR'99), Aug. 1999, pp. 50–57.*

Seymore, K., McCallum, A. and Rosenfeld, R. "Learning Hidden Markov Model Structure for Information Extraction", Proceedings of the AAAI–99 Workshop on Machine Learning for Information Extraction, Jul. 1999.*

Freitag, D. and McCallum, A.K. "Information Extraction with HMMs and Shrinkage", Proceedings fo the AAAI–99 Workshop on Machine Learning for Information Extraction, Jul. 1999.*

Glasgow, B. et al. "MITA: An Information Extraction Approach to Analysis of Free–form Text in Life Insurance Applications", Artificial Intelligence, vol. 19, No. 1, 1998, pp. 59–71.*

Cardie, C. "Empirical Methods in Information Extraction", Artificial Intelligence, vol. 18, No. 4, 1997, pp. 65–80.*

Freund, Y. and Schapire, R.E. "Experiments with a New Boosting Algorithm", Proceedings of the 13$^{th}$ International Conference on Machine Learning, 1996.*

Voorhees, E.M. "Query Expansion using Lexical–Semantic Relations", Proceedings of the 17$^{th}$ Annual ACM Conference on Research and Development in Information Retrieval, Aug. 1994, pp. 61–69.*

Liddy, E.D. and Mtaeng, S.H. "DR–LINK: A System Update for TREC–2", Proceedings of the Text REtreival Conference (TREC 2), 1993, pp. 85–100.*

Deerweister, S. et al. "Indexing by Latent Semantic Analysis", Journal of the American Society of Information Science, vol. 41, No. 6, 1990, pp. 391–407.*

* cited by examiner

COMPONENTS FOR
STANDARDIZING DOCUMENTS

ALTERNATIVE COMPONENTS FOR
STANDARDIZING DOCUMENTS

COMPONENTS FOR
UNRAVELING DOCUMENTS

UNRAVELING
THE MOST
RECENT OBJECT

UNRAVELING
THE SECOND MOST
RECENT OBJECT

METHODS OF IMPROVING
PROCESSING EFFICIENCY

METHOD AND APPARATUS FOR MAKING PREDICTIONS ABOUT ENTITIES REPRESENTED IN DOCUMENTS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a method and apparatus for making predictions about entities represented in text documents. It more particularly relates to a more highly effective and accurate method and apparatus for the analysis and retrieval of text documents, such as employment résumés, job postings or other documents contained in computerized databases.

2. Background Art

The challenge for personnel managers is not just to find qualified people. A job change is expensive for the old employee, the new employee, as well as the employer. It has been estimated that the total cost for all three may, in some instances, be as much as $50,000. To reduce these costs, it is important for personnel managers to find well matched employees who will stay with the company as long as possible and who will rise within the organization.

Personnel managers once largely relied on résumés from unsolicited job applications and replies to newspaper help-wanted advertisements. This presented a number of problems. One problem has been that the number of résumés from these sources can be large and can require significant skilled-employee time even for sorting. Résumés received unsolicited or in response to newspaper advertisements would present primarily a local pool of job applicants. Frequently most of the résumés are from people unsuited for the position. Also, a résumé oftentimes only described an applicant's past and present and did not predict longevity or promotion path.

One attempt at finding a solution to the oftentimes perplexing problems of locating qualified, long-term employees has been to resort to outside parties, such as temporary agencies and head-hunters. The first temporary agency started in approximately 1940 (Kelly Girl, now Kelly Services having a website at www.kellyservices.com) by supplying lower-level employees to business. Temporary agencies now offer more technical and high-level employees. The use of head-hunters and recruiters for candidate searches is commonplace today. While this approach to finding employees may simplify hiring for a business, it does not simplify the problem of efficiently finding qualified people. It merely moves the problem from the employer to the intermediary. It does not address finding qualified employees who will remain with, and rise within, the company.

In recent years, computer bulletin boards and internet newsgroups have appeared, enabling a job-seeker to post a résumé or an employer to post a job posting, which is an advertisement of a job opening. These bulletin boards and internet newsgroups are collectively known as "job boards," such as those found at services identified as misc.jobs.resumes and misc.jobs.offered. Presently, World Wide Web sites were launched for the same purpose. For example, there are websites at www.jobtrak.com and www.monster.com.

On internet job boards, the geographic range of applicants has widened, and the absolute number of résumés for a typical personnel manager to examine has greatly increased. At the same time, the increasing prevalence of submission of résumés in electronic format in response to newspaper advertisements and job board postings has increased the need to search in-house computerized databases of résumés more efficiently and precisely. With as many as a million résumés in a database such as the one found at the website www.monster.com, the sheer number of résumés to review provides a daunting task. Because of the ubiquity of computer databases, the need to search efficiently and to select a single document or a few documents out of many, has become a substantial problem. Such a massive text document retrieval problem is not by any means limited to résumés. The massive text document retrieval problem has been addressed in various ways.

For example, reference may be made to the following U.S. Pat. No.: 4,839,853, COMPUTER INFORMATION RETRIEVAL USING LATENT SEMANTIC STRUCTURE; U.S. Pat. No. 5,051,947, HIGH-SPEED SINGLE-PASS TEXTUAL SEARCH PROCESSOR FOR LOCATING EXACT AND INEXACT MATCHES OF A SEARCH PATTERN IN A TEXTUAL STREAM; U.S. Pat. No. 5,164,899, METHOD AND APPARATUS FOR COMPUTER UNDERSTANDING AND MANIPULATION OF MINIMALLY FORMATTED TEXT DOCUMENTS; U.S. Pat. No. 5,197,004, METHOD AND APPARATUS FOR AUTOMATIC CATEGORIZATION OF APPLICANTS FROM RESUMES; U.S. Pat. No. 5,301,109, COMPUTERIZED CROSS-LANGUAGE DOCUMENT RETRIEVAL USING LATENT SEMANTIC INDEXING; U.S. Pat. No. 5,559,940, METHOD AND SYSTEM FOR REAL-TIME INFORMATION ANALYSIS OF TEXTUAL MATERIAL; U.S. Pat. No. 5,619,709, SYSTEM AND METHOD OF CONTEXT VECTOR GENERATION AND RETRIEVAL; U.S. Pat. No. 5,592,375, COMPUTER-ASSISTED SYSTEM FOR INTERACTIVELY BROKERING GOODS FOR SERVICES BETWEEN BUYERS AND SELLERS; U.S. Pat. No. 5,659,766, METHOD AND APPARATUS FOR INFERRING THE TOPICAL CONTENT OF A DOCUMENT BASED UPON ITS LEXICAL CONTENT WITHOUT SUPERVISION; U.S. Pat. No. 5,796,926, METHOD AND APPARATUS FOR LEARNING INFORMATION EXTRACTION PATTERNS FROM EXAMPLES; U.S. Pat. No. 5,832,497, ELECTRONIC AUTOMATED INFORMATION EXCHANGE AND MANAGEMENT SYSTEM; U.S. Pat. No. 5,963,940, NATURAL LANGUAGE INFORMATION RETRIEVAL SYSTEM AND METHOD; AND U.S. Pat. No. 6,006,221, MULTILINGUAL DOCUMENT RETRIEVAL SYSTEM AND METHOD USING SEMANTIC VECTOR MATCHING.

Also, reference may be made to the following publications: "Information Extraction using HMMs and Shrinkage" Dayne Freitag and Andrew Kachites McCallum, Papers from the AAAI-99 Workshop on Machine Learning for Information Extraction, AAAI Technical Report WS-99-11, July 1999; "Learning Hidden Markov Model Structure for Information Extraction," Kristie Seymore, Andrew McCallum, and Ronald Rosenfeld, Papers from the AAAI- 99 Workshop on Machine Learning for Information Extraction, AAAI Technical Report WS-99-11, July 1999; "Boosted Wrapper Induction" Dayne Freitag and Nicholas Kushmerick, to appear in Proceedings of AAAI-2000, July 2000; "Indexing by Latent Semantic Analysis" Scott Deerwester, et al, Journal of the Am. Soc. for Information Science, 41(6):391–407, 1990; and "Probabilistic Latent Semantic Indexing," by Thomas Hofman, EECS Department, UC Berkeley, Proceedings of the Twenty-Second Annual SIGIR Conference on Research and Development in Information Retrieval.

Each one of the foregoing patents and publications are incorporated herein by reference, as if fully set forth herein.

Early document searches were based on keywords as text strings. However, in a large database, simple keyword searches oftentimes return too many irrelevant documents, because many words and phrases have more than one meaning (polysemy). For example, being a secretary in the state department is not the same as being Secretary of State.

If only a few keywords are used, large numbers of documents are returned. Keyword searches may also miss many relevant documents because of synonymy. The writer of a document may use one word for a concept, and the person who enters the keywords uses a synonym, or even the same word in a different form, such as "Mgr" instead of "Manager." Another problem with keyword searches is the fact that terms cannot be readily weighted.

Keyword searches can be readily refined by use of Boolean logic, which allows the use of logical operators such as AND, NOT, OR, and comparative operators such as GREATER THAN, LESS THAN, or EQUALS. However, it is difficult to consider more than a few characteristics with Boolean logic. Also, the fundamental problems of a text-string keyword search still remain a concern. At the present time, most search engines still use keyword or Boolean searches. These searches can become complex, but they currently suffer from the intrinsic limitations of keyword searches. In short, it is not possible to find a word that is not present in a text document, and the terms cannot be weighed.

In an attempt to overcome these problems, natural language processing (NLP) techniques have been applied to the problems of information extraction and retrieval, including hidden Markov models. Some World Wide Web search engines, such as Alta Vista and Google, use latent semantic analysis (U.S. Pat. No. 4,839,853), which is the application of singular value decomposition to documents.

Latent semantic analysis has also been used for cross-language document retrieval (U.S. Pat. Nos. 5,301,109 and 6,006,221) to infer the topical content of a document (U.S. Pat. No. 5,659,766), and to extract information from documents based on pattern-learning engines (U.S. Pat. No. 5,796,926). Natural Language Processing has also been used (U.S. Pat. No. 5,963,940) to extract meaning from text documents. One attempt at simplifying the problem for résumés was a method for categorizing résumés in a database (U.S. Pat. No. 5,197,004).

These techniques have generated improved search results as compared to prior known techniques, but matching a job posting with a résumé remains difficult, and results are imperfect. If these techniques are applied to a massive number of résumés and job postings, they provide only a coarse categorization of a given résumé or job posting. Such techniques are not capable of determining the suitability of a candidate for a given position. For example, certain characteristics such as the willingness and ability for employment longevity or likelihood for moving along a job promotion path may be important to an employer or a candidate.

Therefore, it would be highly desirable to have a new and improved technique for information analysis of text documents from a large number of such documents in a highly effective and efficient manner and for making predictions about entities represented by such documents. Such a technique should be useable for résumés and job postings, but could also be used, in general, for many different types and kinds of text documents, as will become apparent to those skilled in the art.

SUMMARY OF THE INVENTION

Therefore, the principal object of the present invention is to provide a new and improved method and apparatus for making predictions about entities represented by documents.

Another object of the present invention is to provide a new and improved method for information analysis of text documents to find high-quality matches, such as between résumés and job postings, and for retrieval from large numbers of such documents in a highly effective and efficient manner.

A further object of the present invention is to provide such a new and improved method and apparatus for selecting and retrieving from a large database of documents, those documents containing representations of entities.

Briefly, the above and further objects are realized by providing a new and improved method and apparatus for information analysis of text documents where predictive models are employed to make forecasts about entities represented in the documents. In the employment search example, the suitability of a candidate for a given employment opportunity can be predicted, as well as other certain characteristics as might be desired by an employer, such as the employment longevity or expected next promotion.

A method and apparatus is disclosed for information analysis of text documents or the like, from a large number of such documents. Predictive models are executed responsive to variables derived from canonical documents to determine documents containing desired attributes or characteristics. The canonical documents are derived from standardized documents, which, in turn, are derived from original documents.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
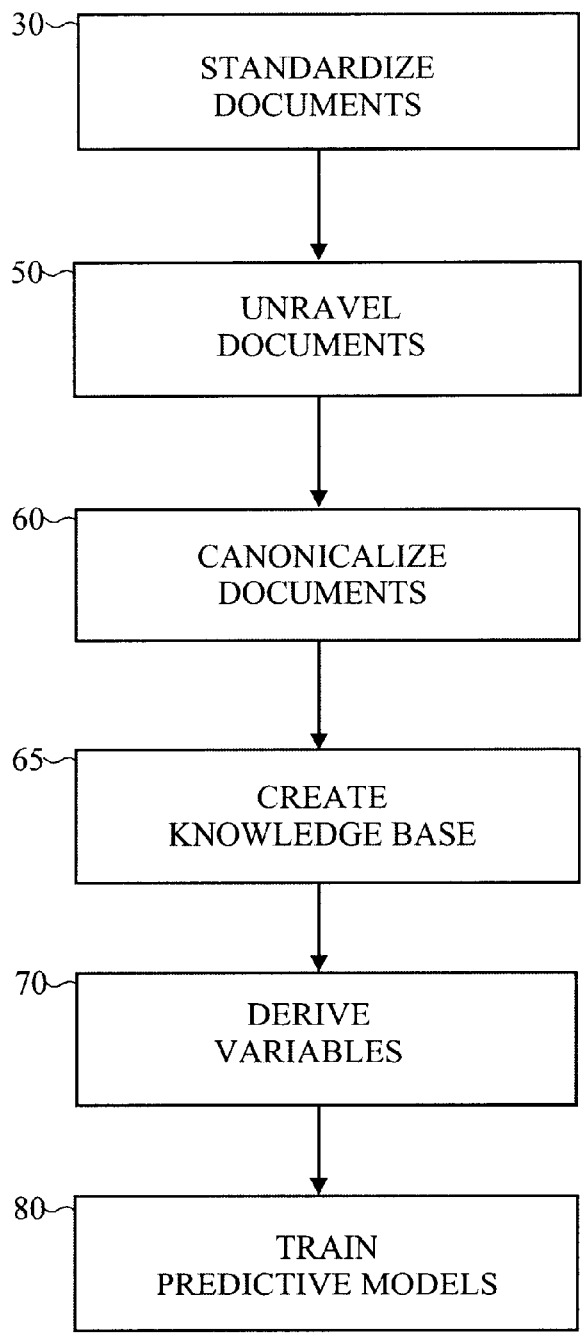
FIG. 1 illustrates a flow chart diagram of a method for creating predictive models for retrieving text documents in accordance with the present invention.
Figure 2:
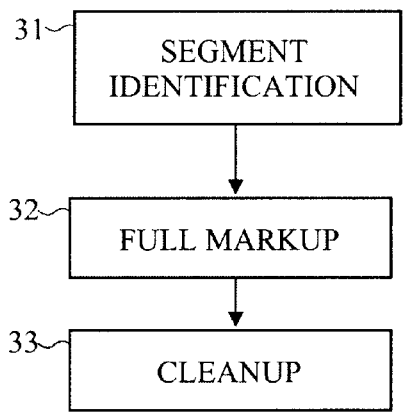
FIG. 2 illustrates a flow chart diagram of a method for standardizing documents for retrieving text documents in accordance with the present invention.
Figure 3:
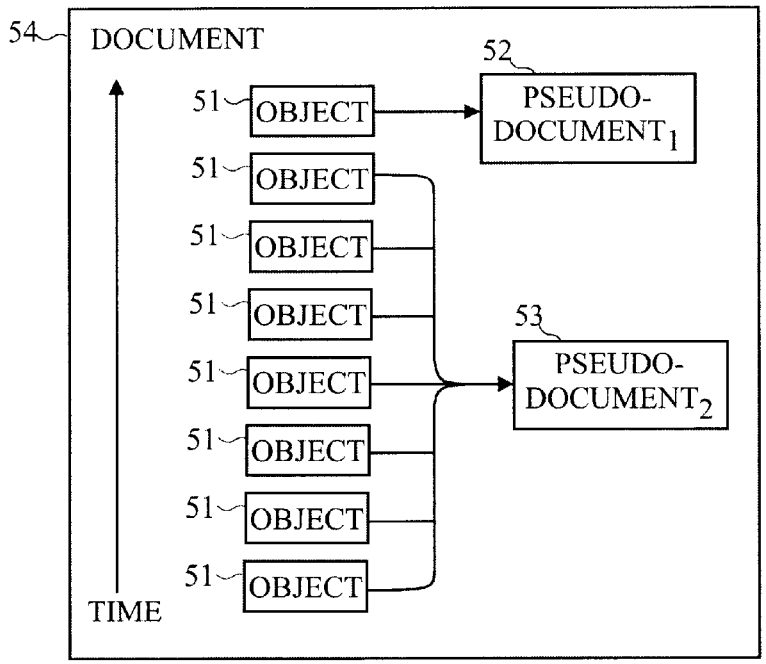
FIG. 3 illustrates a flow chart diagram of a method and system for unraveling text documents in accordance with the present invention.
Figure 3:
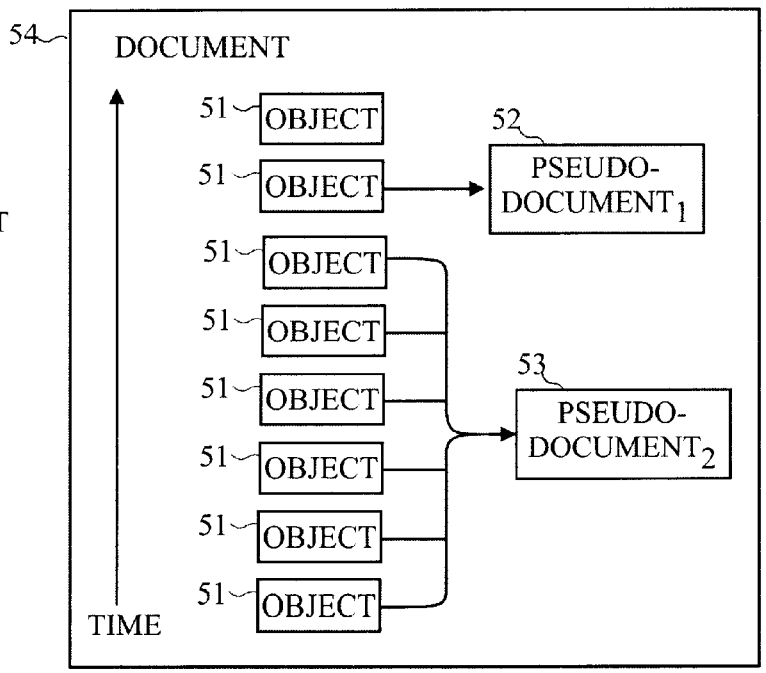

The methods and systems illustrated in FIGS. 1, 2, and 3 are utilized during development and maintenance of the system. In the best mode of the invention, a development dataset of documents is standardized at 30, unraveled at 50, and canonicalized at 60. Variables are derived at 70 and used to train predictive models at 80.

Figure 4:
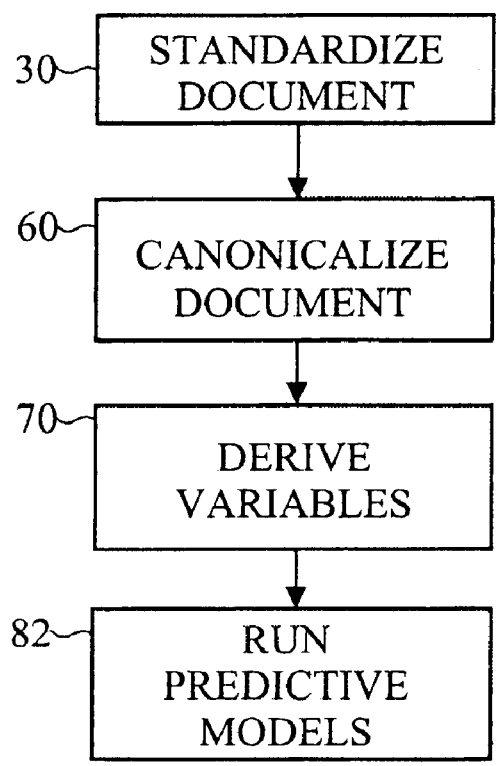
FIG. 4 illustrates a flow chart diagram of a method and system for making predictions about entities represented by documents and retrieving text documents in accordance with the present invention.
Figure 5:
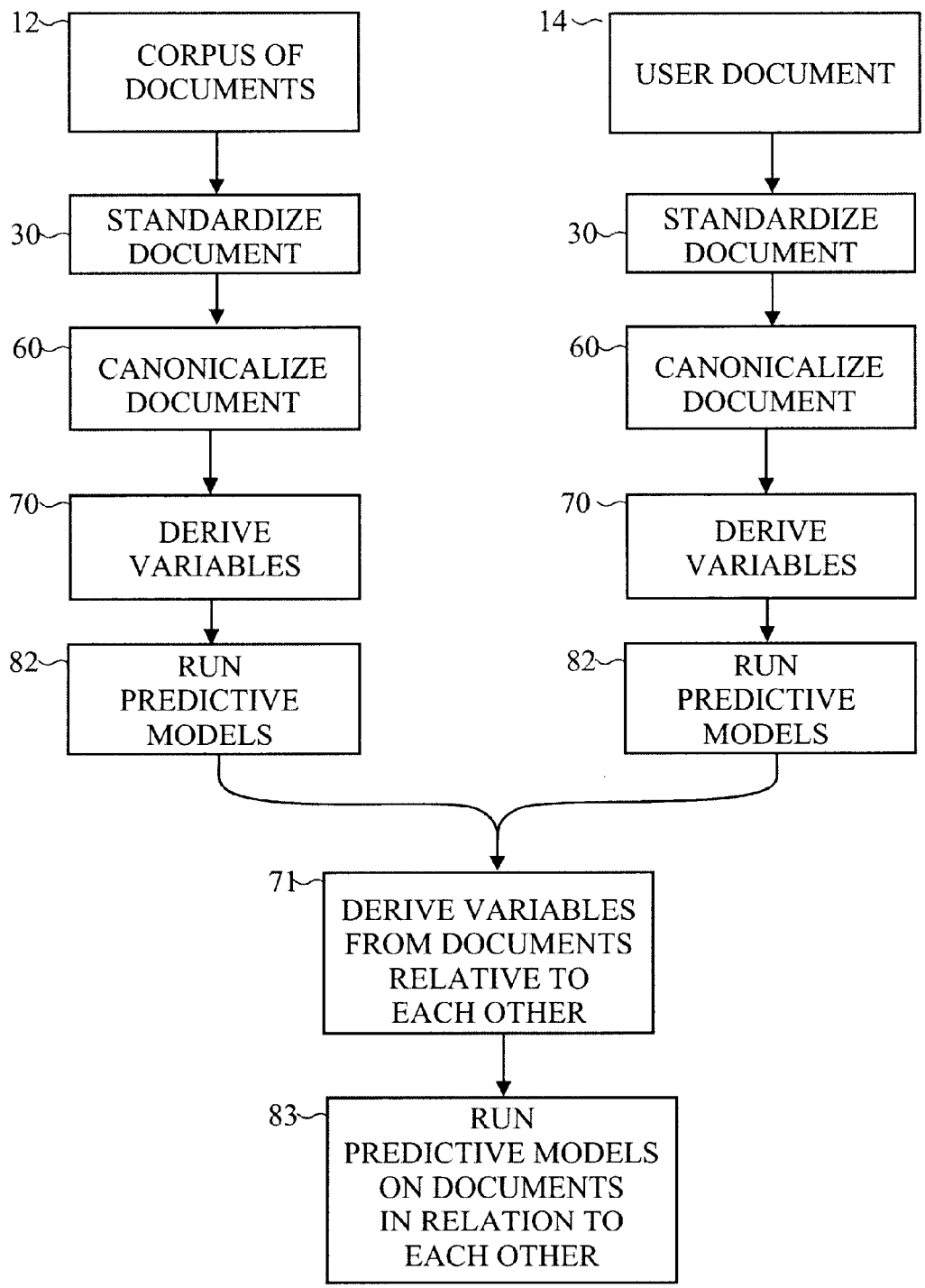
FIG. 5 illustrates a flow chart diagram of a method and system for matching documents for retrieving text documents in accordance with the present invention.
Figure 6:
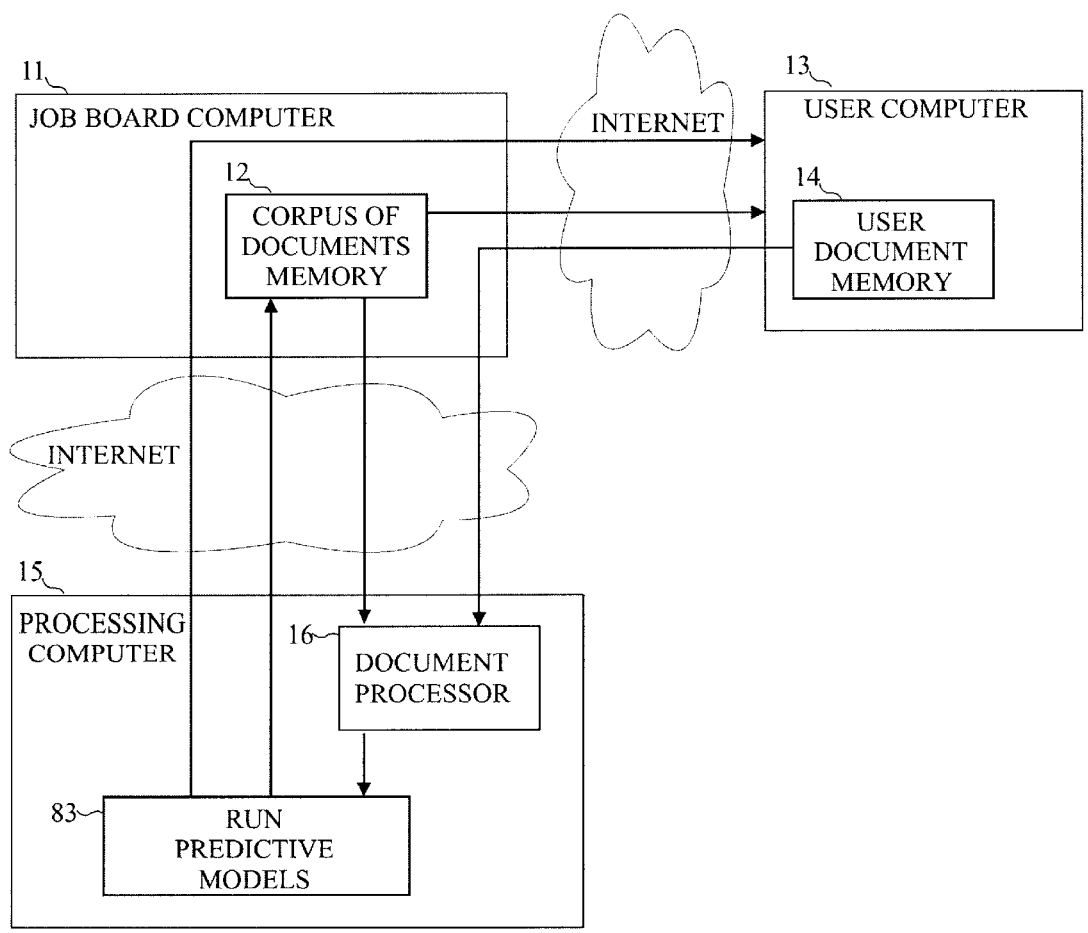
FIG. 6 illustrates a functional block diagram of a computer apparatus; for retrieving text documents in accordance with the present invention.

The methods and systems illustrated in FIGS. 2, 4, 5, 6 and 7 are utilized during production in the computer system. In one form of the invention relating to the facilitation of job searching, as shown in FIG. 6, a corpus of documents are stored in a memory 12 of an internet job board computer 11. A user document, stored in a memory 14 or otherwise input by a user, is input from a user computer 13 or other suitable equipment connected through the internet to a document processor 16 of a processing computer 15 for processing the document 14 in accordance with the inventive method as hereinafter described in greater detail. Predictive models, as hereinafter described, are run, and predictions are returned to the user computer 13 and/or the internet job board computer 11.

While the computer system of FIG. 6 is preferred, other systems may be employed for creating or using predictive models for documents, for job postings and résumés, as well as other text documents. The inventive process can also take place in a single computer or on a local or wide-area network. A company can use the process to analyze its own database of résumés or its own history of postings and job descriptions.

In general, while the disclosed example of the invention shown and described herein relates to job searches for matching job postings and résumés, it will become apparent to those skilled in the art that many different types and kinds of documents containing text can be subjected to information analysis and predictive modeling in accordance with the method and apparatus of the present invention. For example, from analyzing high-school student and college records, colleges which will accept a particular high-school student can be predicted. Also, predictions can be made as to which ones of the colleges, the student would be successful. By comparing original applications of students against their college records, a college can predict the college success of new applicants.

The inventive system makes predictions about entities represented in text documents and retrieves documents based on these predictions. In the job search example, candidates are represented by résumés, and positions are represented by job postings. The following description begins with an overview of how to create the predictive models of the present invention, and then a detailed explanation of their use. After describing how the parts of the system are constructed, and how the system as a whole is created, the deployment of the system is described.

Predictive models must be trained on a development dataset prior to being deployed for production use. This training requires a dataset wherein the output for each input object is known. In the job search example, if the objective of the predictive model is to assess the quality of match between a candidate and a position, then a historical set of inputs, along with their known, matched outputs is required. In the current example, this means that known résumé/posting pairs are required where a candidate represented by a résumé got the position represented by the associated posting. Such training data can be obtained from a variety of sources, including recruiters, employers, and job boards.

Creating predictive models from documents generally includes five operations in the preferred embodiment of the invention.

Figure 7:
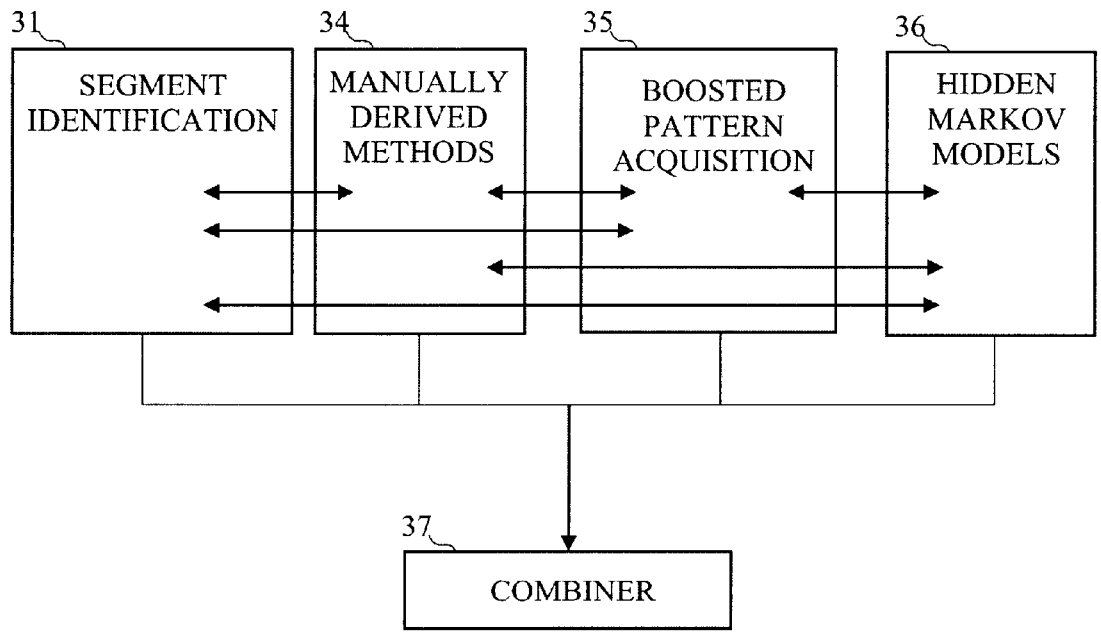
FIG. 7 illustrates a flow chart diagram of another method for standardizing documents in accordance with the present invention.

Standardizing a development dataset is first performed and is the method of converting it to a structured format suitable for automatic processing. The preferred embodiment uses a mix of information extraction techniques. As shown in FIG. 1, as initial steps of the inventive method, a development dataset of documents is standardized at 30. As shown in FIGS. 2 and 7, methods are illustrated for standardizing documents. Information extraction techniques are used to parse and label document components.

A method for creating a dataset for predictive modeling is illustrated in FIG. 3. If documents in the development dataset include time-ordered objects, as résumés typically do in the experience and education segments, a training dataset of known input/output pairs is manufactured by a process known as unraveling 50. In unraveling a document, objects in a time series and prior objects in that series are considered as matched input/output pairs. In the example of résumés, jobs listed in the experience segment are considered as job descriptions for which the previous jobs comprise the job history of a person who obtained that job. These unraveled pseudo-documents can be used as known input/output pairs for training predictive models at 80.

Thereafter, canonicalizing a document is creating a canonical, numerical representation of the document. The preferred embodiment uses a fixed lexicon and semantic analysis.

Information about meta-entities is derived from the canonical dataset and stored as a knowledge base. This knowledge base provides information for variable derivation when scoring particular documents.

Variables are derived from numerical vectors and categoricals contained in the canonical data. Statistical information about the meta-entities included in a specific document is retrieved from the knowledge base, and this information is also used to derive variables.

Model training data in the preferred embodiment includes a large number of observations, where each observation is an input/output pair. The input (entity for which prediction is to be made) is represented by the derived variables; the output is the true value of the quantity to be predicted.

An abbreviated version of the inventive system is also possible in several configurations. One skilled in the art could optionally skip standardization 30, unraveling 50, canonicalization 60, or variable creation 70, and still be able to create models 80 that make predictions about entities represented in text documents. It is also possible to create predictive models with only one or two of the other operations.

Standardizing

Standardizing a document includes parsing and labeling components of the document in a structured format suitable for automatic processing. This can be accomplished in several way. For example, documents can be entered through a standard computer interface. This method, while extremely accurate, can be extremely slow and inconvenient for some applications.

Alternatively, documents can be hand tagged in a mark-up language or hand entered into a database. This method is labor-intensive and high-precision. Computer services performed in a third-world country and transmitted back and forth across the internet makes this option increasingly cost-effective. An entire standardized dataset can be hand tagged or entered. This method is useful to standardize a development dataset, but it is too slow to use during production in response to user input for some applications.

Another approach is to use information extraction (IE) techniques, which automatically finds sub-sequences of text, and which can then be marked up in a markup language. This method can be used on a development dataset during development and on user documents during production. For many applications, this is the preferred method.

During development, part or all of a dataset is hand tagged for use in developing IE tools. Once the IE tools are developed, they can be used for several purposes. For example, these tools are run on the raw, untagged development dataset 30 to process it into a standardized dataset used in the development of other components of the system. During production, these IE tools are used to automatically standardize documents from the corpus 12 and user documents 14.

Acquiring a Development Dataset

The method disclosed for creating predictive models begins by acquiring a development dataset of documents. As the current example uses résumés and job postings, the development dataset described includes résumés and job postings, each stored as a separate text file. Tens of thousands of résumés and job postings can be collected as part of the development effort. The résumés and job postings can be obtained through a variety of techniques, including collecting data from recruiters, and downloading data from internet job boards and other internet sources using a bot.

Preparing the Development Dataset

The development documents are first cleaned to remove odd characters and HTML markings, leaving plain text. A subset of the documents, ranging in the thousands, are hand tagged.

Level 1 tags identified major segments in the résumés, including contact information, objective, summary, education, experience, skills, professional membership or activity, and statements.

Level 2 tags are nested within level 1 tags. Information tagged included address, phone, email, website, citizenship, eligibility, relocation, clearance, activities, institution, date ranges, completion dates, degree, major, minor, grade point average, honors, descriptions, courses, titles, employers, department, job types, skills, languages, affiliations, publications, personal, and references.

Level 3 tags consisted of information within addresses and visa status.

Developing Standardization Tools

In the preferred form of the invention, in the example of résumés, standardization takes place in three stages, as illustrated in FIG. 2: segment identification at 31; full markup at 32; and cleanup at 33.

If documents are structured in segments with different content types, as résumés typically are, segment identification 31 finds the boundaries of the segments and then identifies their subject matter. In the example of résumés, segment subject matters include all the level 1 tags described above, such as contact information, experience, education, and. Segment identification is best done with a combination of techniques that complement each other. In the preferred form of the invention, three kinds of techniques are used, and the results are summed: manually derived methods; boosted pattern acquisition (BPA); and hidden Markov models (HMMs). Manually derived methods are used to identify and classify segment boundaries, while statistical methods are used to classify segment contents.

Manually derived methods include regular expressions and word and phrase lists. Regular expressions may be used to express patterns which in the development dataset indicate segment boundaries, such as lines consisting solely of upper-case characters. Word and phrase lists are collections of words or phrases which, when present, indicate the beginning of a particular segment. In the case of résumés, examples include "Objective," "Experience," "Job," "Professional Experience," "Employment History," "Skills," "Education," "Accomplishments," or "Awards" at the beginning of a line. Boosted pattern acquisition is a technique for automatically acquiring patterns similar in form and function to regular expressions and word lists. Given a set of tagged documents, BPA outputs a set of weighted patterns that identify boundaries of a particular kind (e.g., the beginning of an "Education" segment). Creation of these patterns involves an iterative process described in detail in a publication entitled "Boosted Wrapper Induction" by Dayne Freitag and Nicholas Kushmerick, scheduled for publication in Proceedings of AAAI-2000, July 2000. Advantages of BPA include the high precision of the resulting patterns, the automatic nature of the process, and the scores associated with the resulting segmentation or extraction (by which the accuracy of the method can be controlled).

After the boundaries of segments are found, the segments are classified using HMMs and term-vector statistical techniques. As with BPA, the tagged development dataset is used to train these models. If term-vector techniques are used, term selection is first performed to isolate those terms consistently indicative of particular segment classes (e.g., "Experience"). If HMMs are used, the model is trained to account for all terms. HMMs can be applied in a number of ways. One can create a separate HMM for each type of field, or create a single HMM with a node for each type of field, or create a larger HMM that performs segmentation while modeling all levels (Levels 1–3 in the case of résumés) simultaneously.

This particular use of HMMs is described in detail in a publication entitled "Information Extraction using HMMs and Shrinkage" by Dayne Freitag and Andrew Kachites McCallum, Papers from the AAAI-99 Workshop on Machine Learning for Information Extraction, AAAI Technical Report WS-99-11, July 1999, and in a publication entitled "Learning Hidden Markov Model Structure for Information Extraction," by Kristie Seymore, Andrew McCallum, and Ronald Rosenfeld, Papers from the AAAI-99 Workshop on Machine Learning for Information Extraction, AAAI Technical Report WS-99-11, July 1999, which are incorporated herein by reference.

Cleanup is the process of checking, and possibly modifying, the output of the HMM. The output of cleanup is a standardized document. Cleanup may involve a number of different steps, including verifying that markup respects document layout (In the example or résumés, for example, Level 1 boundaries occur at line breaks), ensuring that Level 2 fields have the correct structure (e.g., names include at least two words, all capitalized), and comparing Level 2 and Level 3 markup with fields predicted by auxiliary high-precision methods (such as BPA). Elements can be checked to see where they are in relation to the rest of the document or the rest of the segment; for example, contact information should not appear in the middle of a page.

Alternative Methods to Standardize Documents

In general, segment identification 31, manually derived methods 34, BPA 35, and HMMs 36 can be used in conjunction to standardize documents, as illustrated in FIG. 7. Information passes from one technique to another as necessary, and results from the various techniques are combined in a combiner 37. It is possible to standardize documents 30 with other combinations of these techniques. If the documents being analyzed do not naturally fall into segments, as with job postings, the segment identification stage 31 is likely to be unnecessary.

Even if the documents do naturally fall into segments, as with résumés, one could skip segment identification 31 and get results from raw data using any of the techniques, but the results would be inferior. To omit BPA, for example, would reduce precision. To omit HMMs would reduce recall. The entire standardization step 30 could be done with HMMs, but if there is reliable information that some region of text belongs to a particular kind of segment, the HMM can be constrained to add only markup that is appropriate for that type of segment, which increases precision considerably. Other subject matters may require different combinations, depending on the kind of information being extracted, but this combination yields the best results for résumés and job postings.

Unraveling Documents

Unraveling documents 50 is a method for creating a dataset of known input/output pairs for use in training predictive models. It requires a dataset of documents that include time-ordered information. The dataset must have been at least partially tagged to identify dates. In the preferred embodiment, the standardized dataset of documents is unraveled.

Unraveling treats an object in a time-ordered series 51 as the outcome 52 of prior objects in that series. This is illustrated by FIG. 3. Possible object types include events, states, conditions, and prices. In unraveling a document 54 that includes time-ordered objects 51, the most recent object from a time-ordered series is removed and stored as a pseudo-document_sub1 52. Earlier objects in the series are stored as a related pseudo-document_sub2 53.

In the example of résumés, the experience and education segments are considered as a single series. The most recent job or educational event listed is considered as a job posting or job description, and the rest of the experience and/or education segments is considered as the résumé of the person who got that job. The most recent job and the rest of the experience segment and education segments are stored as a matching input/output pair.

If desired, the two most recent jobs or educational events can be removed, and the earlier parts of the experience and/or education segments considered to be the résumé of the person who got the second-most-recent job, and then to the third most recent job and so on as far as one wants to go, with each earlier job or educational event being an outcome to the input of a shorter history.

For documents other than résumés, depending on the subject matter, an indefinite number of contiguous objects in a series 51 can be removed, including the most recent object. The oldest removed object is stored as a pseudo-document_sub1 52, and earlier objects in the series are stored as a related pseudo-document_sub2 53.

Sometimes it will be useful to consider only some of the earlier objects as a related pseudo-document_sub2 53, such as only the most recent earlier objects. Some historical information may not be available, such as an old address.

Canonicalizing Documents

To canonicalize a document is to conflate synonyms to a single term and convert text documents to numerical vectors, which makes analysis more convenient. The preferred embodiment uses a fixed lexicon and semantic analysis. The output is a canonical document.

Canonicalizing Documents: Fixed Lexicon

Synonyms are a common challenge in deriving variables and training predictive models. A "manager" is the same as a "mgr," but predictive models would see them as different. "UCSD" is the same as "the University of California at San Diego." Capitalization must be considered, too, or "Software" and "software" will be different terms. If synonyms are not conflated to a single term, the results will be less accurate; furthermore, processing efficiency may be reduced.

A fixed lexicon is a canonical list of terms; that is, a set of groups of synonyms and the one term by which each group of synonyms will be represented. When the lexicon is applied to documents, it substitutes canonical terms for non-canonical synonyms. For example, "SDSU," "San Diego State," "San Diego State University," and "San Diego State U." can all be represented by "SDSU."

For some fields, the canonical list is constructed statistically and may not have a natural human interpretation. For example, using the semantic analysis referred to below, clusters of candidates can be created, and any individual candidate can be categorized by the cluster center they are closest to.

Canonicalizing Documents: Semantic Analysis

After synonyms have been conflated by the fixed lexicon, semantic analysis translates each document into a numerical representation. The semantic analysis can be run after synonyms have been conflated by the fixed lexicon, or independent of the conflation.

Semantic analysis techniques include latent semantic analysis (LSA) and probabilistic latent semantic analysis (PLSA). In the preferred embodiment, in the example of résumés and job postings, PLSA is used.

The preferred semantic analysis technique for converting a document to a numerical vector is probabilistic latent semantic analysis (PLSA). PLSA is dissimilar to LSA in that it has a statistical foundation based on the likelihood principle and defines a proper generative data model. PLSA is described in detail in a publication entitled "Probabilistic Latent Semantic Indexing," by Thomas Hofman, EECS Department, UC Berkeley, Proceedings of the Twenty-Second Annual SIGIR Conference on Research and Development in Information Retrieval, which is incorporated herein by reference.

LSA is an alternative semantic analysis technique. LSA is the application of singular value decomposition (SVD) to documents. It is explained in detail in a publication entitled "Indexing by Latent Semantic Analysis" by Scott Deerwester, et al, Journal of the Am. Soc. for Information Science, 41(6): 391–407, 1990 and in U.S. Pat. No. 4,839,853, Computer information retrieval using latent semantic structure, which are incorporated herein by reference.

A term-by-document matrix created from a standardized development dataset of résumés and job postings in English typically includes on the order of 30,000 dimensions. SVD uses matrix algebra to factor this large matrix into three smaller matrices, one of which represents the dataset in fewer dimensions than the large matrix.

After semantic analysis has been applied, the document has been converted from a series of text strings to a series of numbers; it is now a vector in document space. Semantic analysis can be applied to an entire document and also to different parts of the document, so different vectors can represent a document and its parts. Different semantic analysis techniques (such as SVD and PLSA) might be applied to different parts. Rather than selecting one vector to represent the document, all are part of the characterization and are used later as appropriate. In the job search example, parts analyzed separately might include skills and professional experience.

Creating a Knowledge Base of Meta-entities

A historical dataset of documents, such as résumés and job postings, provides historical data about more than the applicant or the job being offered. Historical information about meta-entities mentioned in documents is extracted, summarized, and stored. In the case of job-postings and résumés, meta-entities include academic institutions, companies, degree levels, job titles, and majors. This information includes behavioral characteristics such as hiring patterns of individual companies and industries. It also includes transition information, such as job pathways. This historical data can be extracted during development and referred to during production.

For example, the job experience segment of a résumé is in one sense a list of companies and the job title and duties of a person who worked there in the past. The current job on a résumé shows the job title and duties of someone who works there now. The job experience segment of a corpus of résumés shows patterns in hiring by individual companies. For example, one company might prefer to hire people fresh out of college, while another might want a few years experience. A particular company might put more or less weight on any particular element or derived variable. Analysis of a corpus of résumés can discern this even if the companies do not specify it in their job descriptions or postings. Related information can be extracted from a corpus of job postings. One could construct frequency tables to describe it, such as a company vs. job title table. Information can be extracted for individual companies or for an industry or a section of an industry.

In general, behavioral characterizations can be represented statistically. For example, the number of years a particular person has been out of college can be compared with the average and standard deviation number of years out of college for typical new hires at a particular company. The likelihood that someone with the candidate's degree level would be hired into the posted job title can be looked up. Information about meta-entities is stored for reference when assessing particular entities (such as a particular candidate and a particular position) during production.

Creating Derived Variables

Derived variables are used as inputs to the predictive models 82 and 83. When making a prediction on a particular document (or pair of documents), variables are derived from the canonical representation of the document(s). For some variables, relevant summary information for meta-entities or attributes appearing in the document is retrieved from the knowledge base and this summary information is used for deriving variables. In the example of résumés and job postings, for example, useful representations of information for each object may be: numerical vectors 60 (ex. canonical vector summarizing job experience); and categoricals (ex. job-title; university; required skills).

Deriving Variables From Numerical Vectors

During canonicalization, semantic analysis translates a text document to a numerical vector. If the text-to-number translator is run separately on parts of a text document, other vectors are attained. In the example of résumés, one may get vectors describing only the experience segment (or any other segment). A vector may represent part of a segment, such as a person's last job or a weighted sum of previous jobs. In the example of a job posting, a vector might represent skills required. These vectors are created during canonicalization 60 of the standardized document.

When making a prediction for a single document, this vector can serve as input to the model. When assessing how well two objects match, measures of similarity, such as dot product, can be derived.

Deriving Variables From Categoricals

Job postings and résumés include a number of categoricals that can be exploited. Résumé categoricals include job title, school attended, college major, name of company worked for, skill, human language spoken, and the numerical vectors created during canonicalization. Job posting categoricals include job title, name of company, skill, and the numerical vector created during canonicalization.

When making a prediction or forecast for a single document, the knowledge base may contain information as to how the instance of the categorical corresponds to the item to be predicted. This information can be used for deriving model inputs. When assessing how well two objects match, the knowledge based can be used to derive variables indicating how well a categorical in one document corresponds to a categorical in the other. For example, if a is an element in categorical A in one document, and b is an element in categorical B in another document, how well do the two documents match? Depending on the model target, quantities such as the following, looked up from a co-occurrence table in the knowledge base, serve as modeling input variables:

$$\text{prob}(b \in B / a \in A) \ \text{prob}(a \in A / b \in B).$$

It may also be useful to normalize these quantities by the unconditioned probability of one of the items.

If the knowledge base contains too few examples to accurately assess the probabilities, one can stabilize by going to a comparable peer group. For example, if too few résumés or postings mentioning a particular company, one can use the average for all companies in the same industry, or the same specialty.

Deriving Variables From a Mixture of Categoricals and Numerics

Sometimes a categorical in one document is to be assessed against a numeric quantity in the other. For example, in the example of résumés and postings, one may wish to assess whether the job-title in the posting is suitable for the number of years that the person has been out of school.

Behavioral characterizations for possible values of the categorical can exist in the knowledge base. For example, in the example cited, the average number of years since graduation for individuals in each job-title may be listed. This information can be used either as direct input to the model, or to derive variables that compare the looked-up information with the value from the other document. Comments about stabilizing statistics, as given in the previous section, also apply here.

Training Predictive Models

The present invention relates to making predictions about entities that are represented in documents. A prediction is an unknown quantity that is to be assessed, estimated, or forecast for or about an entity. Predictions are made by running documents through predictive models, which can be considered as formulas that map input variables to an estimation of the output.

An entity is any real or conceptual object about which predictions can be made using predictive models. Entities include, but are not limited to, individuals, companies, institutions, events, activities, prices, places, products, relationships, and physical objects. In the job search example, entities represented in résumés and/or job postings may include, but not limited to, individuals, companies, positions, candidate/position pairs, exemplar/candidate pairs, and exemplar/exemplar pairs.

Quantities predicted about entities may include, but are not limited to, candidate/position match quality; a candidate's next salary; a candidate's next position; a candidate's likelihood of relocating; and the amount of time it will take to fill a position.

The data describing the entity can, in part or in whole, include textual documents; in the job search example, candidates are described by résumés, and positions are described by job postings.

More than one entity can be represented in a document, and an entity can be represented in more than one document. In the job search example, a candidate is represented in a single document, and a candidate/position pair is represented in a résumé/job posting pair.

As stated above, predictive models can be considered as formulas that map input variables to an estimation of the output. Typically, a predictive model learns this mapping through a training process carried out on a dataset of known input/output pairs. Examples of predictive models include linear regression and neural networks. The preferred form of the invention uses a back-propagating neural network. When training the neural network, random weights are initially assigned in the network. Observations from the training dataset are fed to the model. Based on the true output for each corresponding input, the weights within the network are automatically adjusted to more accurately predict the outputs. The process is repeated, with variations, until the weights for the inputs correctly predict the known outcomes in the training dataset.

During production, the models are run on other datasets with similar inputs 82. Documents can also be compared with each other 83, and predictions can be made about documents in relation to each other.

Input/output Pairs for Training

Matched input/output pairs for model training may come from a variety of sources. For résumés and postings, these sources include company human resource departments and recruiters for employment. If a company keeps résumés it receives from job applicants and knows which of those applicants were hired for what positions, that will provide excellent input, especially regarding that company's hiring practices. Recruiters have résumés of people they have placed, but they do not often have as many as one would like for a training dataset.

Data from companies or recruiters can be of a very high quality. They know with great accuracy which résumé resulted in which job. But it is limited both by the size of database and by that company's or that recruiter's interests, industry, and specialty.

In the job search example, training input to model includes observations created by unraveling résumés. While data from unraveled résumés are of a somewhat lower quality, the uncertainty introduced is outweighed by the size of the dataset that unraveling makes easily available. Résumés are freely available on the internet and can be unraveled into an easily obtainable, indefinitely large training dataset.

Issues in Using Unraveled Data

The input pseudo-document created by unraveling is meant to contain information as it would be at an earlier time. When data from unraveled documents are used as input to the predictive models, one can use either the entire document or only the time-ordered part. Data not coming from the time-ordered part of the document may not accurately represent the world as it was at the earlier time. In the example of an unraveled résumé, the latest job-experience is removed, and the unraveled résumé represents the candidate prior to taking the most recent job. The time-ordered parts, such as the job history as it would appear prior to the most recent job, can be accurately inferred; other information, such as Contact data, Skills, or Objective, may not be relevant to the candidate prior to the most recent job.

The conservative approach is to use only the education and experience sections. This has the advantage of certainty that events used as input really happened before the outcome, but it has the disadvantage of understating the qualifications on the résumé that resulted in that most recent job. The résumé that landed the most recent job listed in a résumé included skills as well as jobs held and duties performed, but those skills are not considered by this method.

Additional input/output pairs for modeling can be obtained by iteratively unraveling a document multiple times, however the uncertainty discussed above increases with each event unraveled from the document. In the example of résumés, enough data is available that it is unnecessary to unravel more than one job. If the subject matter of the documents were different, or if the development dataset were small, more levels might be unraveled.

Predictive Models Created

Specific predictions will vary with the subject matter of the documents. In the job search example, subject-specific predictions created include: match probability; expected next promotion; expected time to fill a position; expected longevity; expected salary; and relocation probability.

Making Predictions About Entities Represented in Documents

During development, several tools are created as follows: standardization tools; canonicalization tools; knowledge base; derived variables; and predictive models. During production, these tools are deployed. In the preferred form of the invention, the tools are applied first to make predictions about entities represented in documents, as illustrated in FIG. 4, and then to match documents, as illustrated in FIG. 5.

To make predictions about a document, comprising a document description or exemplar document (in job search terms, a job description or résumé), the document is standardized 30 and canonicalized 60. Variables are derived from the canonical document 70, partially based on looking up information in the knowledge base, and these variables are run through the predictive models 82.

Matching Documents

In the inventive method for matching documents illustrated by FIG. 5, documents in a corpus 12 are compared with each other, or a user enters a document 14 to be compared with documents from the corpus 12. In the preferred form of the invention, a corpus of documents 12 is batch processed by the processor at 16. A user enters a user document 14 from the memory or otherwise input into the system. The user document 14 is standardized 30 and canonicalized 40; variables are derived 70, and predictive models are run 82. This processed user document is iteratively compared with documents from a corpus of documents 12 that have been preprocessed. Variables are derived from the documents in relation to each other 71, and predictive models are run on the documents in relation to each other 83.

The outcome is a match prediction and a series of subject-matter-specific predictions. Documents are returned to the user according to the values of predictions, including match predictions, resulting in substantially better matches than conventional methods of selecting documents.

In the preferred form of the invention, the user document 14 can be a document description or an exemplar document. In the job search example, a document description is a job posting, and an exemplar document is a résumé. A user can enter a job posting and/or a résumé and compare it against a corpus of job postings and/or résumés. Predictions are made about entities represented in the contents of the user documents and the corpus documents in relation to each other. In the job search example, predictions include expected salary, longevity, promotion path, and likelihood of relocating.

More than one user document can be entered at a time, which documents are then treated as a single document. A user enters multiple descriptions, multiple exemplars, or a mix of descriptions and exemplars, which are then processed as though they were a single document.

Whether the user document 14 is a description, an exemplar, or a mix, the user can specify which kind of document, a description or an exemplar, the document is to be compared with. In the example of résumés and job postings, there are several modes of operation available. For example, an employer enters a job posting and retrieves the résumés that match best. Alternatively, an employer enters a résumé and retrieves the résumés that match best; or an applicant enters a résumé and receives the job postings that match best. Also, an applicant enters a job posting and get back the job postings that match best. To increase processing efficiency, another approach according to the invention is to batch process the corpus of documents 12 in advance, the results stored, and the user document 14 compared against these stored results.

To further increase processing efficiency, documents are stored in an organized manner at any stage in this process. Similar documents are clustered. The system sample clusters so as to proceed in depth only with those clusters where the sample is similar to the desired result. If a sample shows little similarity, the cluster is ignored.

Specific Predictions Made

Within a general subject matter, specific predictions vary with the stage of the process and the nature of the input and the desired outcome. In the example of résumés and job postings, if a user enters a résumé and wants predictions about the person, the résumé represents, the models predict: the person's expected next job or promotion; the person's expected longevity at the next job; the person's expected salary at the next job; and the probability that the person will relocate for the next job.

If a user enters an exemplar résumé and wants the closest matching résumés from a corpus, the models predict for the exemplar and for each résumé in the corpus: match probability with the résumé; match probability for next job desired (objective); match probability for longevity; match probability for salary; and match probability for relocation.

If a user enters a résumé and wants the closest matching job posting, the models predict for the résumé and each job posting: match probability (this is effectively the same as returning the job postings best suited to the résumé); the person's expected next promotion from that job; the person's expected longevity at that job; the expected salary that the person would make at that job; and the probability that the person will relocate for that job.

If a user enters a job posting and wants predictions about the person who will be hired for that job, the models predict: the expected time to fill the position; the expected next promotion of the person who will be hired for that job; the expected longevity of the person who will be hired for that job; the expected salary of the person who will be hired for that job; and the relocation probability of the person who will be hired for that job.

If a user enters a job posting and wants the closest matching résumés, the models predict for the job posting and each résumé: match probability (the probability that each résumé will match the job); the person's expected next promotion from that job; the expected longevity of that person at that job; the expected salary of that person at that job; and the probability that the person will relocate.

If a user enters a job posting and wants the closest matching other job posting, the models predict: match probability; match probability for expected next promotion of the person who is hired; match probability for expected longevity of the person who is hired; match probability for expected salary of the person who is hired; and match probability for relocation of the person who is hired.

Efficiency of the Production System

When matching a résumé against a corpus of postings or a posting against a set of résumés, the corpus of documents to be selected from is often massive. Several measures are taken to improve the efficiency of this process, which are here described using the example of retrieving the best résumés for a given job posting. Significant efficiency gains can be achieved by pre-processing; limiting the number of résumés scored by the predictive model; and storing pre-computed data in memory. Résumés can be pre-processed through the step of canonicalization. The processing through canonicalization is independent of the job posting and can therefore be carried out in advance.

Figure 8:
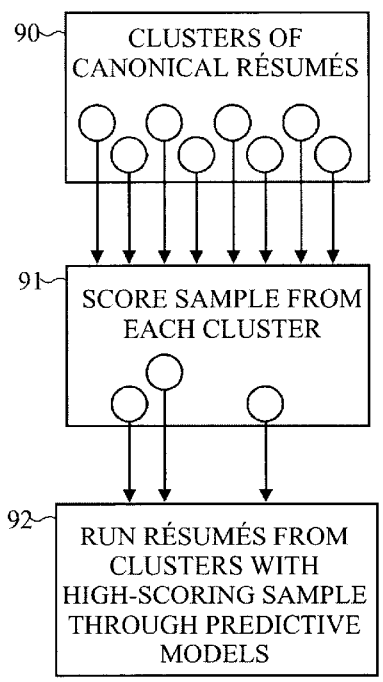
FIG. 8 illustrates a flow chart diagram of a method for improving processing efficiency in matching résumés and job postings in accordance with the present invention.

An initial statistical screening can be applied to limit the résumés that are processed through the predictive model. One technique according to the present invention, illustrated by FIG. 8, is to maintain a clustering of the canonical documents 90. For a new job posting, a sample résumé is selected from each cluster and run through the predictive model 91. Thereafter, only those résumés in clusters whose sample has a sufficiently high match score are run through the predictive model at 92.

Figure 9:
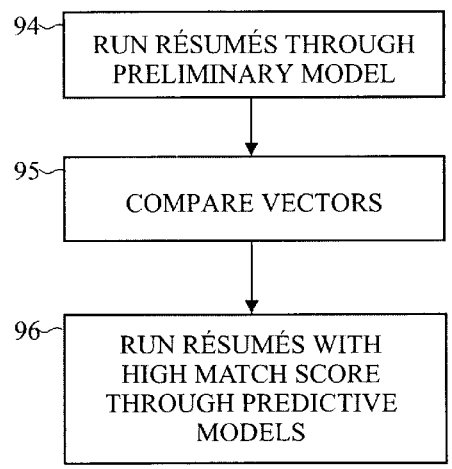
FIG. 9 illustrates a flow chart diagram of a method for improving processing efficiency in matching résumés and job postings in accordance with the present invention.

Another technique according to the present invention is to use a cascaded scoring approach, illustrated by FIG. 9. Each resume runs through a simple preliminary model 94, such as comparing the vectors produced by semantic analysis on each document 95, and only those with sufficiently high scores from the simple model are fully assessed by the final predictive model at 96.

Figure 10:
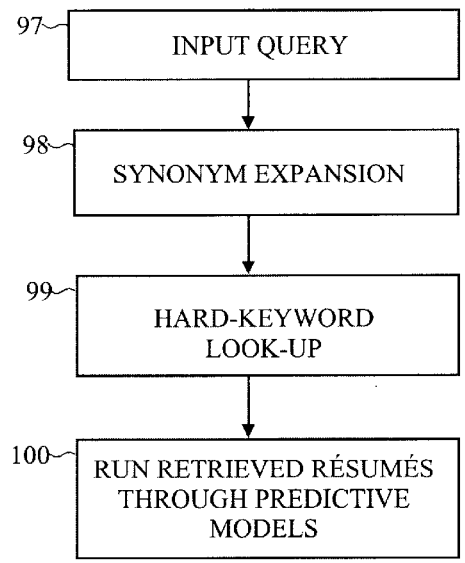
FIG. 10 illustrates a flow chart diagram of a method for improving processing efficiency in matching résumés and job postings in accordance with the present invention.

Another inventive technique to increase search efficiency is a rough front-end search using a hard keyword search after a synonym expansion, as illustrated by FIG. 10. An input query is read 97 and expanded 98 to add to the query a plurality of words related to or synonymous to words in the query. A hard keyword search is done at 99 to find all resumes that match one or more of the words in the query, including words added during synonym expansion. Only those résumés that match enough expanded words are then run through the predictive models at 100.

The matching process can be sped up if data is stored in memory rather than on disk. Storing all data associated with all the résumés can be impractical. When using one of the techniques described above to reduce the number of documents sent through the predictive model, only the data needed to perform the filtering can be stored in memory and the rest left on disk; even if résumés are on disk, the number to be scored by the predictive model can be controlled, to satisfy business speed requirements, by the filtering process.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for creating a dataset for training predictive models from documents unraveled by considering objects in a time-ordered series and earlier objects in the series to be matched input/output pairs.

2. The method according to claim 1, wherein input to the output object includes parts of the document that are not in the time-ordered series.

3. The method according to claim 1, further including moving tags that occur in incorrect places with respect to the format of the document.

4. The method according to claim 1, further including checking fields to make sure the predicted contents have the right structure.

5. The method according to claim 1, further including comparing extraction of an HMM's with those made by other methods.

* * * * *